(12) United States Patent
Barber et al.

(10) Patent No.: US 7,191,406 B1
(45) Date of Patent: Mar. 13, 2007

(54) AVIONICS DISPLAY SYSTEM FOR MEMORIZATION OF DISPLAY CONFIGURATION TO PHASE OF FLIGHT PUSHBUTTONS

(75) Inventors: Sarah Barber, Robins, IA (US); Stephen R. Johnson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 708 days.

(21) Appl. No.: 10/055,258

(22) Filed: Jan. 23, 2002

(51) Int. Cl.
G06F 3/00 (2006.01)
G06F 7/00 (2006.01)
G06F 7/70 (2006.01)

(52) U.S. Cl. .................. 715/771; 715/854; 701/11; 701/14; 701/18

(58) Field of Classification Search ............ 715/771, 715/789, 841, 854, 856, 862; 701/3–18
See application file for complete search history.

(56) References Cited

U.S. PATENT DOCUMENTS

| | | | | |
|---|---|---|---|---|
| 4,811,230 A | * | 3/1989 | Graham et al. | 701/16 |
| 5,100,082 A | * | 3/1992 | Archung | 244/78 |
| 5,844,503 A | * | 12/1998 | Riley et al. | 340/945 |
| 6,057,786 A | * | 5/2000 | Briffe et al. | 340/975 |
| 6,112,141 A | * | 8/2000 | Briffe et al. | 715/856 |
| 6,154,151 A | * | 11/2000 | McElreath et al. | 340/970 |
| 6,542,796 B1 | * | 4/2003 | Gibbs et al. | 701/3 |
| 6,636,354 B1 | * | 10/2003 | D'Hooge et al. | |

* cited by examiner

Primary Examiner—Ba Muynh
Assistant Examiner—Truc T. Chuong
(74) Attorney, Agent, or Firm—Nathan O. Jensen; Kyla Eppele

(57) ABSTRACT

An avionics system having displays with display configurations pilot selected for a phase of flight of an aircraft and reconfigurable for each phase of flight. A multifunction flight display stores and displays the stored phase of flight display configurations for each phase of flight of the aircraft. A cursor control panel connected to the multifunction display for changes from one stored phase of flight display configuration to another stored phase of flight display configuration when the aircraft changes phase of flight. The cursor control panel also is used for reconfiguring the display configuration for each phase of flight. The cursor control panel has phase of flight quick access pushbuttons for selecting a stored phase of flight configuration and for reconfiguring a stored phase of flight configuration into a new phase of flight configuration by selecting the new configuration and pressing a phase of flight quick access pushbutton for a predetermined time to store the new configuration.

14 Claims, 7 Drawing Sheets

AVIONICS DISPLAY SYSTEM FOR MEMORIZATION OF DISPLAY CONFIGURATION TO PHASE OF FLIGHT PUSHBUTTONS

BACKGROUND OF THE INVENTION

This invention relates to avionics systems, flight displays, and more particularly to a flight display that memorizes a display configuration in accordance with a phase of flight.

Modern aircraft cockpits have a number of displays such as primary flight displays (PFD) and multifunction displays (MFD) showing a wide variety of data to pilots for various phase of flight such as climbing to an altitude, cruising at altitude, and descending. Each phase of flight has with it an associated display configuration displaying a number of data parameters needed by the pilot in various formats on the cockpit displays. When the phase of flight changes, the display configuration also needs to change. In addition, pilots and copilots have their individual preferences as to what they would like to see displayed during a phase of a flight.

Configuring cockpit displays for various phases of flight such as, climbing to an altitude, cruising at an altitude, and descending has always involved a certain workload for a pilot. The pilot is required to select a number of different display formats using various input devices such as keyboards, switches, and joysticks. Attempts have been made in the past to automate setting up display configurations by utilizing a series of preset display configurations for each phase of flight. A pilot would select a phase of flight and the displays would automatically be reconfigured depending on the aircraft flight phase to the preset display configuration. These approaches have not worked very well because the display configurations are preset and could not be reconfigured. The preset phase of flight display configurations do not take into account the desire of pilots to configure displays for phases of flight according to personal preferences.

What is needed is an avionics system having displays that have selectable display configurations for each phase of a flight. The displays need to be configured to display data needed for each phase of flight to suit the needs and preferences of individual pilots. The display configurations for each phase of flight should be easily changed.

SUMMARY OF THE INVENTION

An avionics system having displays with display configurations pilot-selected for a phase of flight of an aircraft and reconfigurable for each phase of flight is disclosed. A multifunction display stores and displays phase of flight display configurations for each phase of flight of the aircraft. A cursor control panel connected to the multifunction display is used for changing from one stored phase of flight display configuration to another stored phase of flight display configuration when selected by the pilot for a phase of flight and for reconfiguring the display configuration for each phase of flight.

The multifunction display has a middle window and a lower window for displaying a pilot-selectable display configurations and a line select key for selecting display formats.

The cursor control panel includes phase of flight quick access pushbuttons for selecting a stored phase of flight configuration and for reconfiguring a stored phase of flight configuration into a new phase of flight configuration. The new phase of flight configuration is selected with controls on the cursor control panel and by pressing a phase of flight quick access pushbutton for a predetermined time to store the new configuration. The cursor control panel has a climb quick access pushbutton for selecting a climb phase of flight display configuration and for reconfiguring the climb phase of flight display configuration. The cursor control panel has a cruise quick access pushbutton for selecting a cruise phase of flight display configuration and for reconfiguring the cruise phase of flight display configuration. The cursor control panel has a descend quick access pushbutton for selecting a descend phase of flight display configuration and for reconfiguring the descend phase of flight display configuration.

The multifunction display displays the climb, cruise, and descend phase of flight configuration displays with pilot-selected display configurations for the middle window that may be a vertical terrain profile, a checklist index, or a flight management system text and for the lower window may be a present position format, a plan format, a datalink format, a chart format, a traffic display format, or a maintenance format.

It is an object of the present invention to provide an avionics system having a display that has selectable display configurations for each phase of flight.

It is an object of the present invention to provide a display that can be configured to display data needed for each phase of flight to suit the needs and preferences of individual pilots.

It is a object of the present invention to provide display configurations for each phase of flight that may be easily changed.

It is an advantage of the present invention to provide a pilot with a number of display configurations to select.

It is an advantage of the present invention to provide windows on an avionics display with different display formats.

It is a feature of the present invention to provide a quickly selectable display format for a phase of flight.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
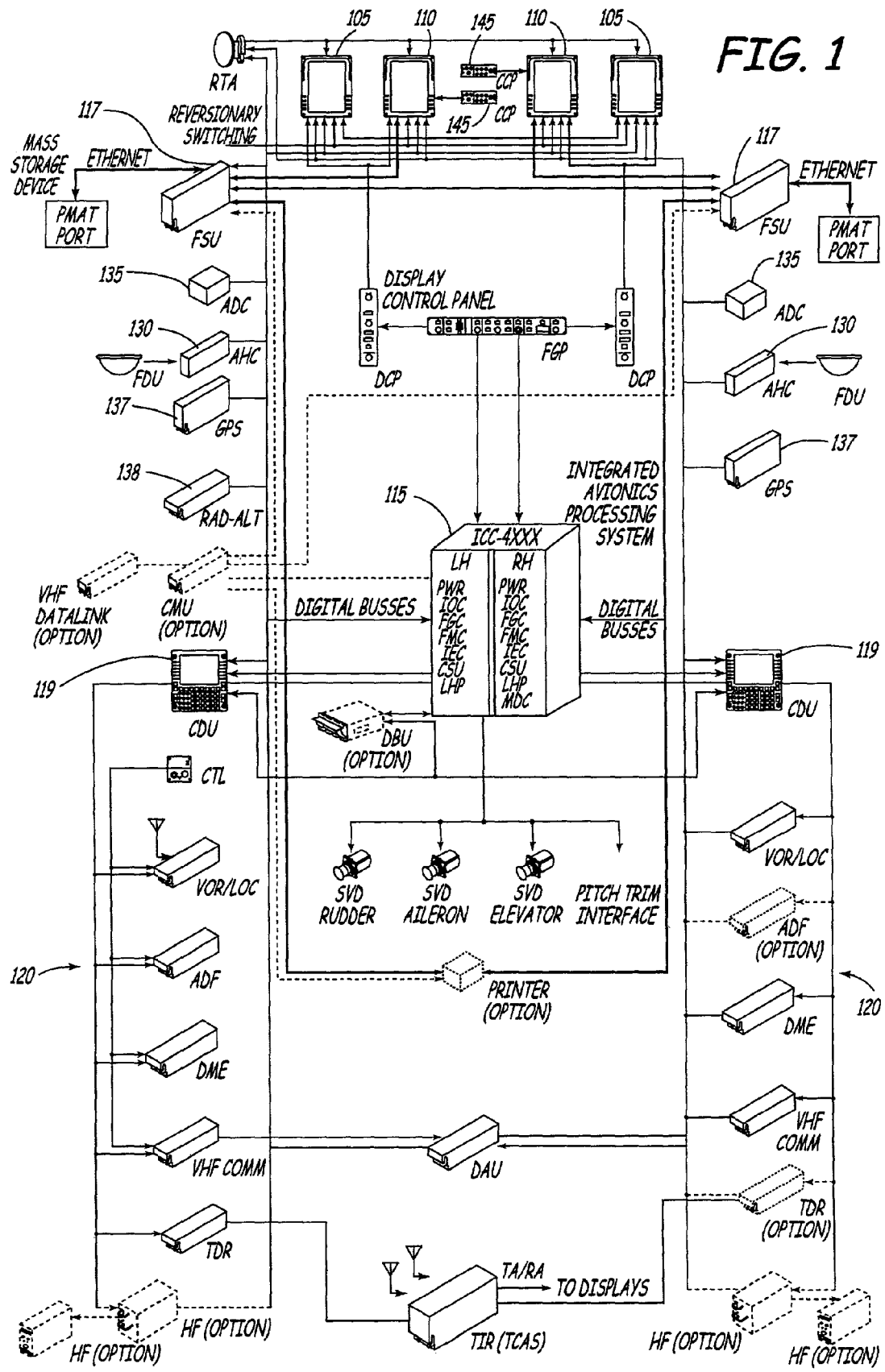
FIG. 1 is block diagram of an avionics system incorporating the present invention.

A typical avionics system 100 that may employ the present invention is shown in exemplary fashion in FIG. 1. The avionics system 100 shown in FIG. 1 is intended for installations in such aircraft as business aircraft, airliners, and other large aircraft. An avionics system such as that shown in FIG. 1 is manufactured by the assignee of the present invention Rockwell Collins Inc.

The avionics system 100 shown in FIG. 1 may have two electronic flight displays that function as a primary flight display (PFD) 105 and a multifunction display (MFD) 110. Alternate numbers of displays may be used. A PFD 105 and an MFD 110 are typically mounted in front of both a pilot and a copilot. To allow for the failure of either the PFD 105 or the MFD 110, each is capable of being pilot-configured to a PFD/MFD format. The PFD/MFD format provides all the instrumentation required for the safe operation of the aircraft. A cursor control panel (CCP) 145 is connected to the MFD 110 to access and manipulate features available on the MFD 110. A CCP 145 is available to both the pilot and copilot.

Also include in the avionics system 100 is an integrated avionics processing system (IAPS) 115 that performs part of the integration functions to interconnect and manage the various avionics subsystems in the aircraft. Included in the IAPS 115 are such items as flight control computers, flight management computers, and maintenance diagnostic computers. Dual cockpit control units (CDU) 119 are provided for integrated multisensor navigation, flight maintenance and execution, sensor control, MFD 110 map support, communications equipment control, and other controls to the avionics system 100. Dual file server units (FSU) 117 provide processing and mass storage databases for the avionics system 100. The FSUs are used to store terrain data and other databases used by the avionics system 100. Various data buses including Ethernet buses interconnect and transfer data between the components in the avionics system 100 as shown by the interconnect lines in FIG. 1. Other components in the typical avionics system 100 are air data computers (ADC) 135, engine indication system (not shown), attitude heading computers (AHC) 130, GPS receivers 137, and a radio altimeter 138. Also connected to the avionics system 100 are various radio systems 120 and their associated antennas. These radio sensors may include VOR/LOC, ADF, DME, ILS, and MLS systems to provide navigational information.

Figure 2:
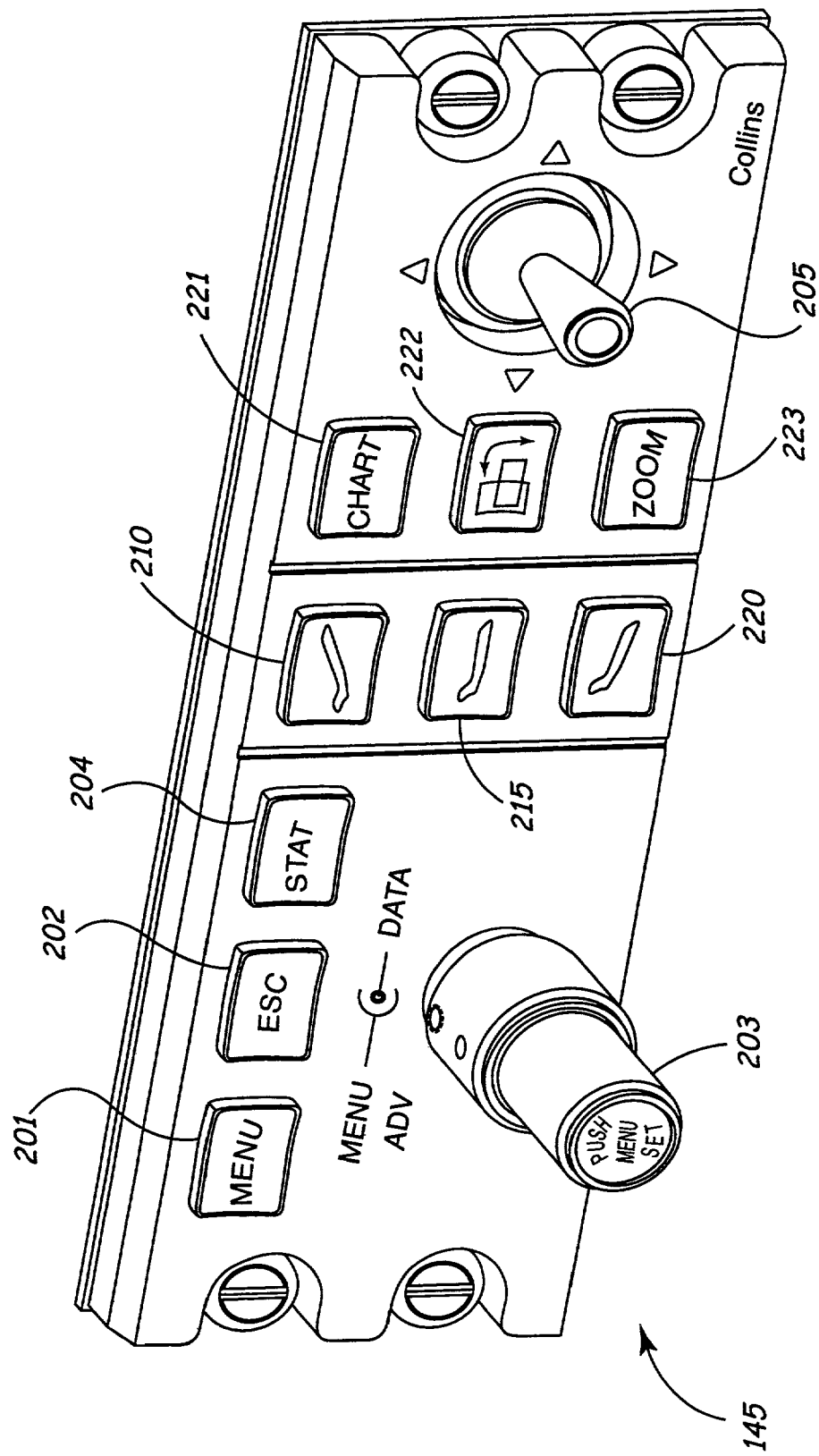
FIG. 2 is a diagram of a front panel of a cursor control panel of FIG. 1 that includes the present invention.

The cursor control panel (CCP) 145 incorporating the present invention is shown in FIG. 2. The cursor control panel 145 is used to control the MFD 110 functions in the avionics system 100 of FIG. 1. Included on the cursor control panel are a menu (MENU) pushbutton 201 to access and exit menus on the MFD 110, an escape (ESC) pushbutton 202 to exit a menu level or data entry mode, and a menu advance (MENU ADV) data entry switch 203 to control menu navigation and selection and data entry. A status (STAT) pushbutton 204 provides access to full format presentations on the MFD 110. A chart (CHART) pushbutton 221 provides control to access and exit a chart format on the MFD 110. An orient pushbutton 222 allows switching the chart format between portrait and landscape orientation. A zoom (ZOOM) pushbutton 223 allows the displayed chart to be zoomed in and out. A joystick 205 provides control for chart pan and zoom and 3D-map orientation. Included on the cursor control device 145 are three phase of flight quick access pushbuttons 210, 215, and 220 that are used to access and update predefined and stored MFD display formats. The three phase of flight preset pushbuttons are ascending or climb 210, level flight or cruise 215, and descend 220 as indicated by an aircraft icon on each button. Other labels and icons may be used on the quick access pushbuttons 210, 215, and 220.

A display configuration for the MFD 110 may be stored in memory within the MFD 110 for each of the three pushbuttons 210, 215, and 220. If a pushbutton is pressed and released, a currently stored display configuration for the selected button for a flight phase is displayed. If a button is pressed and held for some period of time such as three seconds for example, a current display configuration is stored in memory in the MFD 110 for future selection or until replaced with a new memorization action for the flight phase for the appropriate button.

Figure 3:
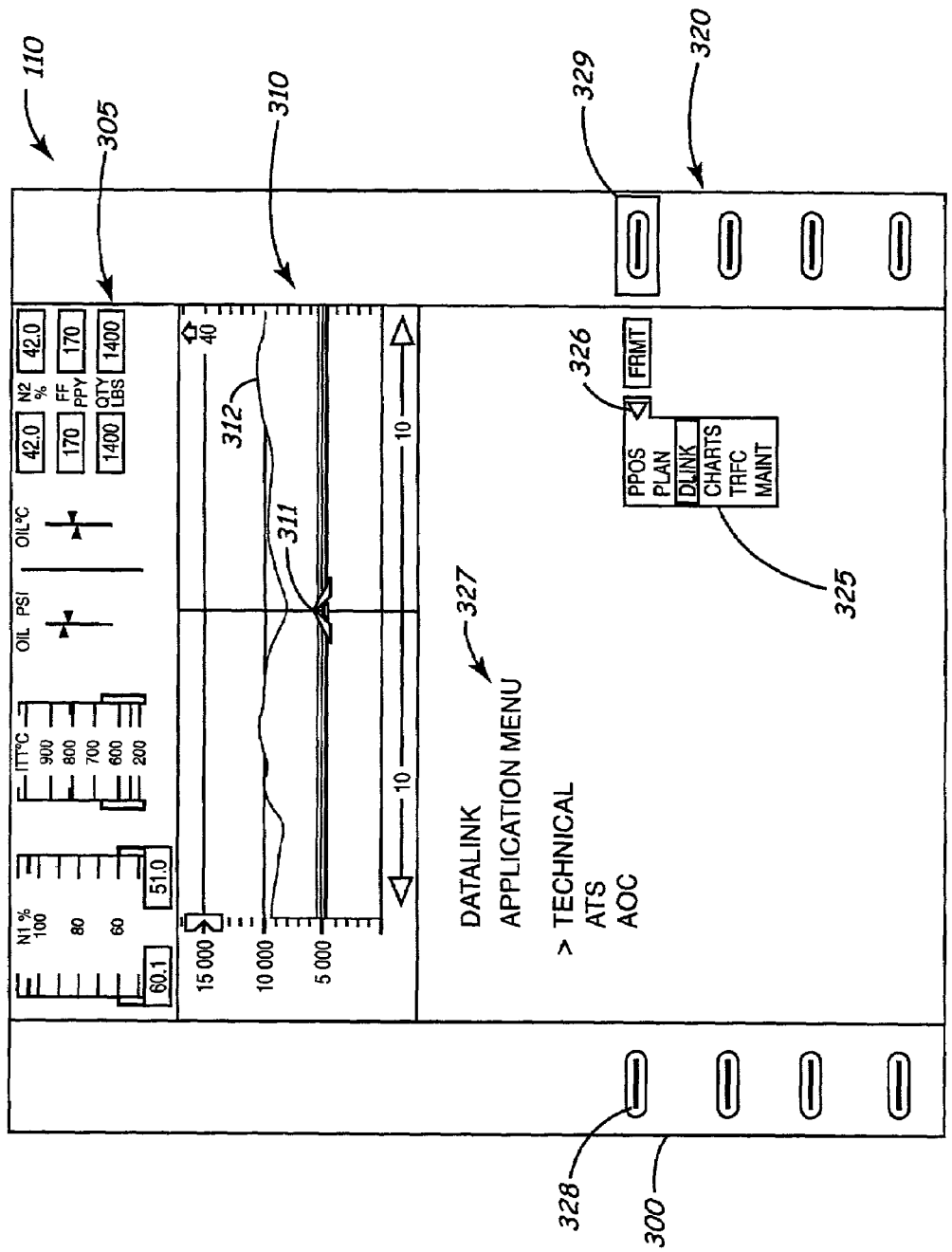
FIG. 3 is a diagram of a typical front panel of a multifunction display of FIG. 1 showing a typical display configuration.

A typical MFD 110 front panel 300 is shown in FIG. 3. The front panel is divided into three smaller virtual display windows. A top window 305 of the MFD 110 is used to display the EIS (engine indication system) data. N1 (turbine fan speed), ITT (inter-turbine temperature), fuel quantity, N2, fuel flow, oil pressure and temperature are displayed in FIG. 3.

A middle window 310 in the MFD 110 in FIG. 3 is showing a vertical terrain profile (VTP) display with the position of the aircraft indicated by an aircraft symbol 311. The VTP display in the middle window 310 presents to the pilot views of the aircraft 311 vertical situation over all phases of flight. The VTP display in window 310 in FIG. 3 is in an end-on view format. The VTP display in window 310 is obtained by determining aircraft location from position determination means on board the aircraft such as the GPS receiver 137 in FIG. 1. The position, altitude, and track of the aircraft are used with terrain database information in the database of the FSU 117 to form a vertical terrain profile view 312 in the FSU processor and pass the data to the MFD 110. Other formats that may be displayed in the middle window include a checklist index, or a flight management system (FMS) text format. These formats are selectable on the MFD 110 by using the CCP 145 pushbuttons and controls in FIG. 2. A format line select key 328 on the MFD 110 may also be used to select the middle window 310 formats. Repeatedly pressing the line select key 328 cycle the middle window display 310 format.

A lower window 320 in FIG. 3 may display one of six formats shown in a format display selection box 325. These six formats are displayed as required during the various phases of flight. A format (FRMT) line select key 329 on the MFD 110 is pressed to select a format in box 325. Repeatedly pressing the FRMT line select key 329 cycles the selected format through the list in box 325. The six selectable formats in box 325 include present position (PPOS) on a compass rose or arc, plan map (PLAN) on a geographical map display, data link (DLINK) for textual and graphical weather information, charts (CHARTS) for electronic Jeppesen charts, traffic (TRFC) for a traffic display from TCAS (traffic collision avoidance system), and maintenance (MAINT) for aircraft maintenance information. In FIG. 3 format select box 325 shows data link (DLINK) highlighted and selected. Window 320 is displaying a datalink applications menu 327.

Figure 4:
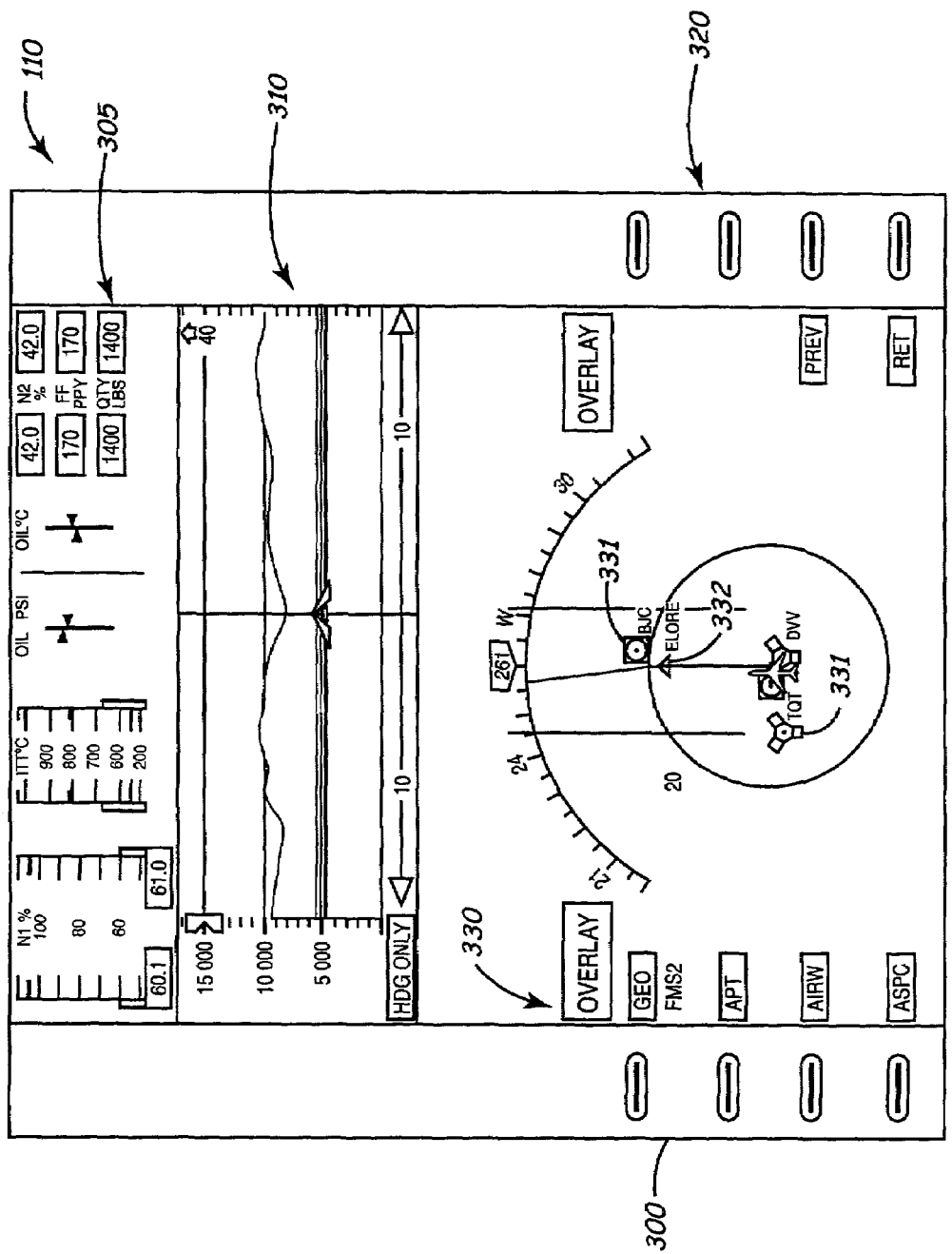
FIG. 4 is a diagram of another front panel display format of the multifunction display of FIG. 3.

FIG. 4 shows a present position (PPOS) view on the front panel 300 of the MFD 110 in the lower window 320. An end-on VTP view is again shown in the middle window 310 of FIG. 4. On the present position (PPOS) or plan map (PLAN) are several different navaids or geographical overlays that may be displayed or hidden from view. Navaids usually consists of high altitude VORs, low altitude VORs, NDBs, and intersections. Shown on FIG. 4 are navaids 331 and an intersection 332. Geographic overlays 330 consist of political boundaries, rivers, lakes, and oceans.

Figure 5:
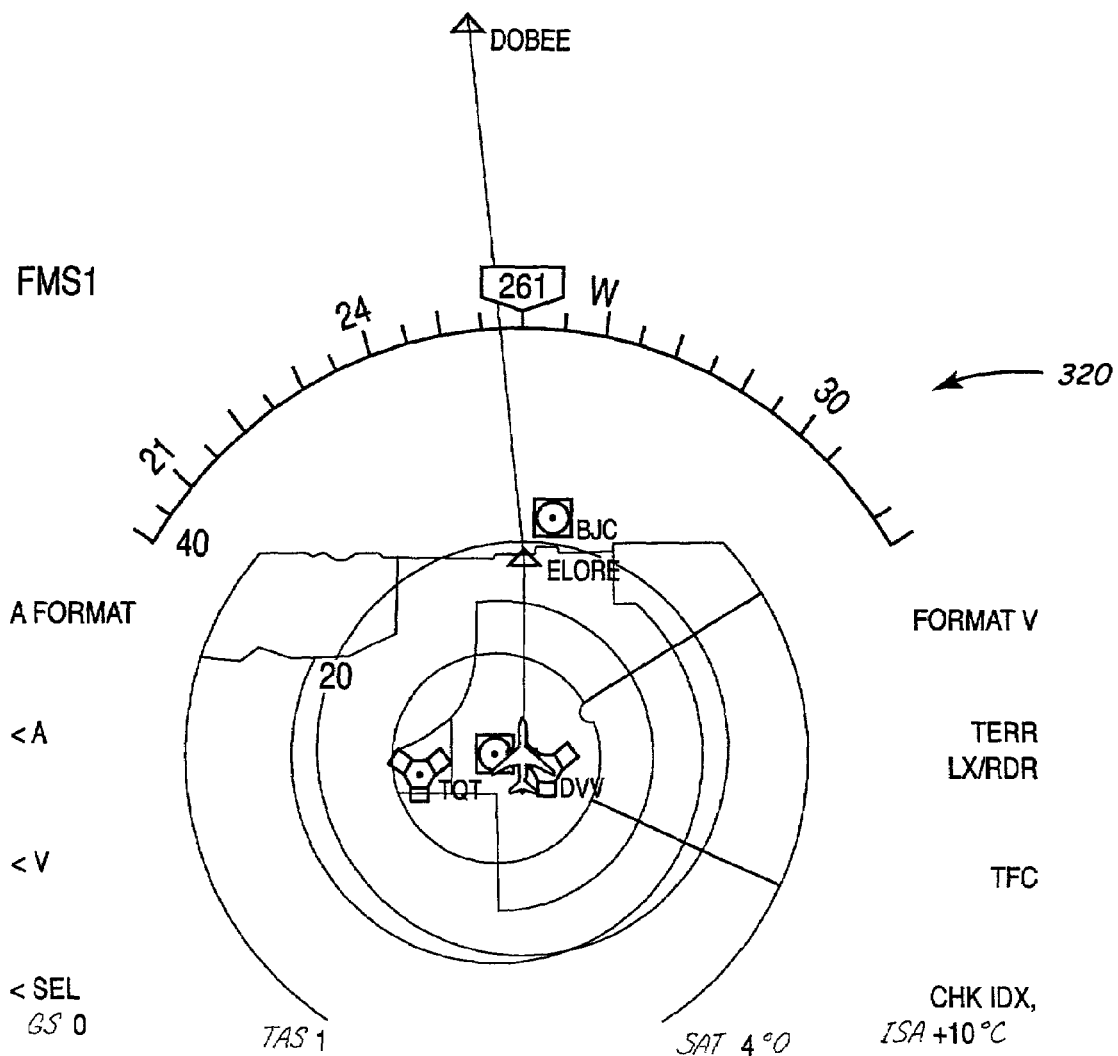
FIG. 5 is a diagram of a typical display format for the lower two windows of the multifunction display of FIG. 3 when an aircraft is in a climb phase of flight.

Selecting and storing may be accomplished as follows for the phases of flight with the quick access pushbuttons 210, 215, and 220 on the cursor control panel 145. Shown in FIG. 5 is the middle window 310 and bottom window 320 of a typical MFD 110 display format for the climb or ascent phase of flight that a pilot may desire. Shown in FIG. 5 is a checklist index displayed in the middle window 310 in place of the VTP display of FIGS. 3 and 4. Four types of checklists may be selected in window 310 including a normal, abnormal, user, and emergency checklist. FIG. 5 shows the present position (PPOS) display in lower window 320 as in FIG. 4. This climb display format may be selected from memory at any time by the pilot by pushing the climb quick access pushbutton 210. If a change to the climb format is desired, the pilot changes the MFD 110 display to a new desired format using the cursor control panel 145, a line select key on the MFD 100, or other means and then presses and holds pushbutton 210 down for some period of time such as three seconds. The new display format is then stored in memory in the MFD 110. Typical items displayed in the climb display configuration may include such pilot-selectable items for the middle window 310 as the checklist index, the FMS text display and the VTP display. The bottom window 320 includes the PPOS, PLAN, DLINK, CHARTS, TRFC, and MAINT displays discussed above.

Figure 6:
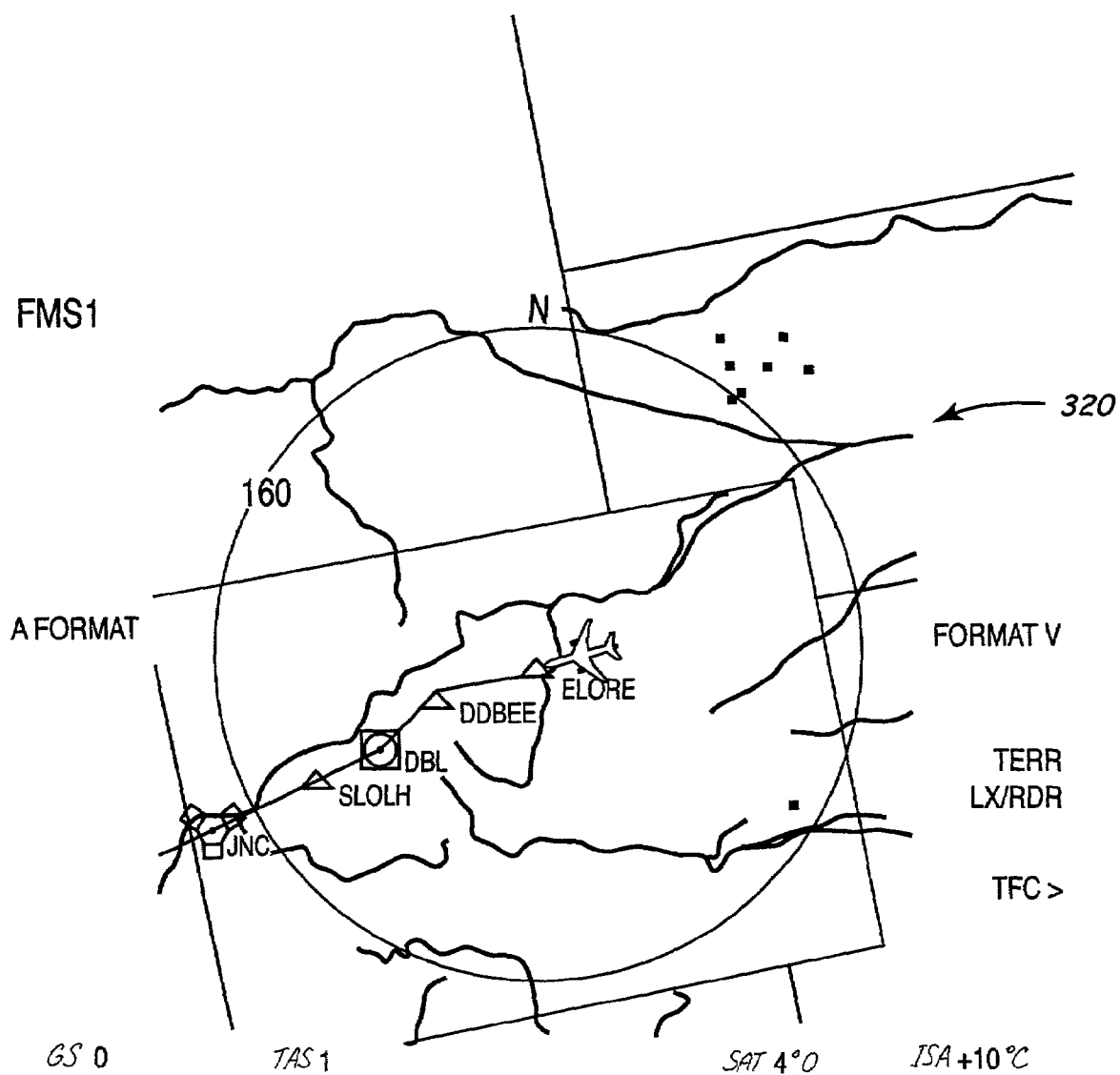
FIG. 6 is a diagram of a typical display format for the lower two windows of the multifunction display of FIG. 3 when an aircraft is in a cruise phase of flight.

When the aircraft transitions from the climb phase to the cruise phase, the pilot pushes the cruise quick access pushbutton 215 to obtain a typical cruise MFD 110 display format as shown in FIG. 6. Window 310 of FIG. 6 now displays the FMS text and window 320 displays the PLAN format. This cruise display format may be changed in the same fashion as described above for the climb pushbutton 210. If the climb format is again desired at this point, the pilot pushes the ascent quick climb pushbutton 215. Items that may be selected for display in the cruise display configuration are the same as for the climb phase of flight.

Figure 7:
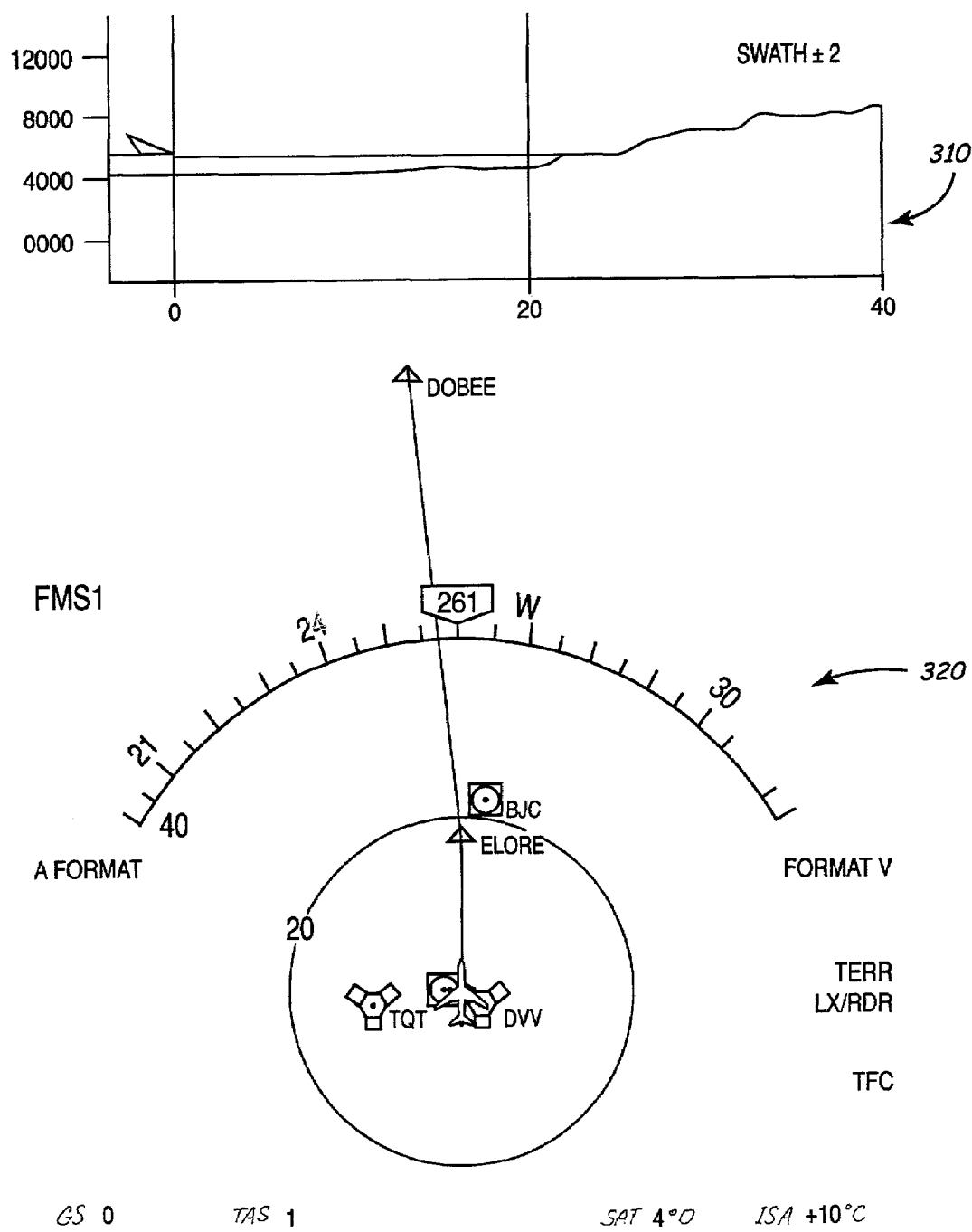
FIG. 7 is a diagram of a typical display format for the lower two windows of the multifunction display of FIG. 3 when an aircraft is in a descend phase of flight.

When the aircraft starts to descend from the cruise mode, the pilot pushes the descend quick access pushbutton 220 and a preselected and stored descend display configuration is shown on the MFD 110 as shown in exemplary fashion in FIG. 7. Window 310 now shows a VTP view that is a side-on view inside of the end-on view shown in FIGS. 3 and 4. The lower window 320 again shows the present position view (PPOS). This descend display format may be changed in the same fashion as described for the climb pushbutton 215. Items that may be selected for display in the cruise display configuration are the same as for the climb phase of flight.

The present invention is described above as being implemented on a multifunction display in an avionics system. As described above the multifunction display and a primary flight display may be utilized interchangeably and the present invention may also be used interchangeably on these flight displays. In addition, other types of flight displays for displaying vertical terrain profiles may be used to incorporate the present invention.

It is believed that the avionics display system for memorization of display configuration to phase of flight pushbuttons of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of selecting, displaying, and reconfiguring display configurations on an avionics display in an avionics system on an aircraft for different phases of flight of the aircraft comprising the steps of:
   selecting a prestored climb display configuration for display on the avionics display with a climb quick access pushbutton on a cursor control panel when the aircraft is in a climb phase of flight;
   reconfiguring the prestored climb display configuration into a new climb display configuration with controls on the cursor control panel and on the avionics display;
   pressing and holding the climb quick access pushbutton for a period of time to store the new climb display configuration;
   selecting a prestored cruise display configuration for display on the avionics display with a cruise quick access pushbutton on the cursor control panel when the aircraft changes to a cruise phase of flight; and
   selecting a prestored descend display configuration for display on the avionics display with a descend quick access pushbutton on the cursor control panel when the aircraft changes to a descend phase of flight.

2. The method of claim 1 further comprising the steps of:
   reconfiguring the prestored cruise display configuration into a new cruise display configuration with controls on the cursor control panel and the avionics display; and
   pressing the cruise quick access pushbutton for a period of time to store the new cruise display configuration.

3. The method of claim 1 further comprising the steps of:
   reconfiguring the prestored descend display configuration into a new descend display configuration with controls on the cursor control panel and the avionics display; and
   pressing the descend quick access pushbutton for a period of time to store the new descend display configuration.

4. The method of claim 1 further comprising the steps of selecting the new climb display configuration on the avionics display with the climb quick access pushbutton on the cursor control panel.

5. A method of selecting, displaying, and reconfiguring display configurations on an avionics display in an avionics system on an aircraft for different phases of flight of the aircraft comprising the steps of:
   selecting prestored display configurations for display on the avionics display with quick access pushbuttons on a cursor control panel in accordance with the aircraft phase of flight;
   reconfiguring the prestored display configurations into new display configurations with controls on the cursor control panel and the avionics display;
   pressing and holding quick access pushbuttons for a period of time to store the new display configurations, wherein the quick access pushbuttons include a climb quick access pushbutton, a cruise quick access pushbutton, and a descend quick access pushbutton to store a respective new prestored climb display configuration, cruise display configuration and descend display configuration by pressing and holding the respective quick access button for the period of time;
   selecting the prestored cruise display configuration for display on the avionics display with the cruise quick access pushbutton on the cursor control panel when the aircraft changes to a cruise phase of flight; and selecting the prestored descend display configuration for display on the avionics display with the descend quick access pushbutton on the cursor control panel when the aircraft changes to a descend phase of flight.

6. The method of claim 5 for selecting, displaying, and reconfiguring avionics display configurations in an avionics system wherein the step of selecting prestored display configurations on the avionics display with the quick access pushbuttons further comprising the steps of:
selecting the prestored climb display configuration for display on the avionics display with the climb quick access pushbutton on the cursor control panel when the aircraft is in a climb phase of flight.

7. The method of claim 6 wherein each of the steps of selecting the climb phase of flight configuration, the cruise phase of flight configuration, and descend phase of flight configuration comprises selecting a middle window display configuration from the group consisting of a checklist index, a flight management system text, and a vertical terrain profile and selecting a lower window display configuration from the group consisting of a present position, plan, datalink, charts, traffic, and maintenance formats.

8. An avionics system having displays with display configurations pilot-selected for a phase of flight of an aircraft and reconfigurable for each phase of flight comprising:
a flight display for storing and displaying stored phase of flight display configurations for each phase of flight of the aircraft; and
a cursor control panel connected to the flight display for changing from one stored phase of flight display configuration to another stored phase of flight display configuration when selected by the pilot for a phase of flight and for reconfiguring the display configuration for each phase of flight, wherein the panel includes quick access pushbuttons including a climb quick access pushbutton to store a new prestored climb display configuration by pressing and holding the climb quick access pushbutton for a period of time, wherein the quick access pushbuttons include a cruise quick access pushbutton, and a descend quick access pushbutton, wherein a prestored cruise display configuration can be selected for display with the cruise quick access pushbutton when the aircraft changes to a cruise phase of flight, and a prestored descend display configuration can be selected for display with the descend quick access pushbutton when the aircraft changes to a descend phase of flight.

9. The avionics system of claim 8 wherein the flight display further comprises:
a middle window for displaying a pilot-selectable display configuration;
a lower window for displaying a pilot-selectable display configuration; and
line select keys for selecting the middle window and lower window display configuration.

10. The avionics system of claim 9 wherein the quick access pushbuttons are flight phase pushbuttons for selecting a stored phase of flight configuration and for reconfiguring a stored phase of flight configuration into a new phase of flight configuration by selecting the new configuration with controls on the cursor control panel and pressing and holding one of the quick access pushbuttons for a predetermined time to store the new configuration.

11. The avionics system of claim 10 wherein the cursor control panel further comprises:
the climb quick access pushbutton for selecting a climb phase of flight display configuration and for reconfiguring the climb phase of flight display configuration;
the cruise quick access pushbutton for selecting a cruise phase of flight display configuration and for reconfiguring the cruise phase of flight display configuration; and
the descend quick access pushbutton for selecting a descend phase of flight display configuration and for reconfiguring the descend phase of flight display configuration.

12. The avionics system of claim 11 wherein the climb phase of flight configuration displays a pilot-selected display configuration for the middle window from the group consisting of a vertical terrain profile, a checklist index, and a flight management system text and for the lower window from the group consisting of a present position, a plan, a datalink, a chart, a traffic, and a maintenance format.

13. The avionics system of claim 11 wherein the cruise phase of flight configuration displays a pilot-selected display configuration for the middle window from the group consisting of a vertical terrain profile, a checklist index, and a flight management system text and for the lower window from the group consisting of a present position, a plan, a datalink, a chart, a traffic, and a maintenance format.

14. The avionics system of claim 11 wherein the descend phase of flight configuration displays a pilot-selected display configuration for the middle window from the group consisting of a vertical terrain profile, a checklist index, and a flight management system text and for the lower window from the group consisting of a present position, a plan, a datalink, a chart, a traffic, and a maintenance format.

* * * * *